(12) United States Patent
Cheong et al.

(10) Patent No.: US 10,919,498 B2
(45) Date of Patent: Feb. 16, 2021

(54) FOG REMOVING DEVICE

(71) Applicant: ELECTRONICS AND TELECOMMUNICATIONS RESEARCH INSTITUTE, Daejeon (KR)

(72) Inventors: Woo-Seok Cheong, Daejeon (KR); Chan Hwa Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 259 days.

(21) Appl. No.: 15/965,511

(22) Filed: Apr. 27, 2018

(65) Prior Publication Data

US 2018/0319371 A1 Nov. 8, 2018

(30) Foreign Application Priority Data

May 2, 2017 (KR) .......................... 10-2017-0056521
Feb. 9, 2018 (KR) .......................... 10-2018-0016520

(51) Int. Cl.
*B60S 1/02* (2006.01)
*H05B 1/02* (2006.01)
*H05B 3/84* (2006.01)
*G01N 27/22* (2006.01)

(52) U.S. Cl.
CPC ............ *B60S 1/026* (2013.01); *G01N 27/223* (2013.01); *H05B 1/0236* (2013.01); *H05B 3/84* (2013.01)

(58) Field of Classification Search
CPC ........ B60S 1/026; B60S 1/023; B60S 1/0822; B60S 1/0825; B60S 1/0874; G01N 27/223; H05B 1/0236; H05B 3/84; B60J 1/002
See application file for complete search history.

(56) References Cited

U.S. PATENT DOCUMENTS

| 7,208,962 | B2 | 4/2007 | Sun et al. |
| 7,788,935 | B2 | 9/2010 | Jang et al. |
| 7,972,713 | B2 | 7/2011 | Fleury et al. |
| 2003/0150129 | A1* | 8/2003 | Kang ............... B60H 1/00785 34/519 |
| 2008/0223127 | A1* | 9/2008 | Schmitt ............... B60S 1/0822 73/170.17 |

(Continued)

FOREIGN PATENT DOCUMENTS

| KR | 1998066158 A | 10/1998 |
| KR | 1020040030737 A | 4/2004 |

(Continued)

OTHER PUBLICATIONS

Jin-Young Jeon et al., "Development of Control Simulator for Integrated Sensor Module of Vehicle", Journal of Sensor Science and Technology, 2013, pp. 65-70, vol. 22, No. 1.

(Continued)

*Primary Examiner* — Dana Ross
*Assistant Examiner* — Joe E Mills, Jr.

(57) ABSTRACT

Provided is a fog removing device including a sensor configured to detect fog to generate sensing data, a heater configured to generate heat to remove the fog, and a control unit configured to supply a power to the heater by using the sensing data. The sensor includes a substrate, a first electrode and a second electrode, which are provided on the substrate and electrically disconnected from each other, and a recess region defined between the first and second electrodes.

10 Claims, 16 Drawing Sheets

(56) References Cited

U.S. PATENT DOCUMENTS

| | | | |
|---|---|---|---|
| 2011/0084641 A1 | 4/2011 | Um et al. | |
| 2013/0024169 A1* | 1/2013 | Veerasamy | B32B 17/10036 |
| | | | 703/2 |
| 2013/0181727 A1* | 7/2013 | Nishizawa | G01R 1/02 |
| | | | 324/658 |
| 2015/0346865 A1 | 12/2015 | Hong et al. | |
| 2017/0276711 A1* | 9/2017 | Pak | H01L 21/306 |
| 2018/0022320 A1* | 1/2018 | Lee | G01N 27/221 |
| | | | 324/663 |
| 2018/0117988 A1* | 5/2018 | Sarnia | B60H 1/00785 |

FOREIGN PATENT DOCUMENTS

| | | |
|---|---|---|
| KR | 1020060055474 A | 5/2006 |
| KR | 1020090059974 A | 6/2009 |
| KR | 1020100104262 A | 9/2010 |
| KR | 1020160028666 A | 3/2016 |
| KR | 1020160096901 A | 8/2016 |

OTHER PUBLICATIONS

Thomas M. Urbank et al., "Development and Application of an Integrated Dew Point and Glass Temperature Sensor", Sae Technical Paper Series, 2001, Society of Automotive Engineers, Inc.

"Tech Note: What is a Transparent Window Heater?" Abrisa Technologies, Apr. 2011, www.abrisatechnologies.com.

"Transparent Heater with Capacitive Controls on a Single SANTE® Film", Apr. 17, 2014, pp. 1-11, Innovatechstudio.

* cited by examiner

FOG REMOVING DEVICE

CROSS-REFERENCE TO RELATED APPLICATIONS

This U.S. non-provisional patent application claims priority under 35 U.S.C. § 119 of Korean Patent Application Nos. 10-2017-0056521, filed on May 2, 2017, and 10-2018-0016520, filed on Feb. 9, 2018, the entire contents of which are hereby incorporated by reference.

BACKGROUND

The present disclosure herein relates to a fog removing device.

In general, a fog removing system for a vehicle includes a moisture sensing unit, a temperature sensing unit, a memory unit in which a predetermined value necessary for controlling moisture in a vehicle is stored, and a control unit controlling moisture in the vehicle, which is detected by the moisture sensing unit. When a difference value between temperatures of the inside and outside of the vehicle is greater than a reference value, and a moisture value in the vehicle is greater than a predetermined moisture value, an operation signal may be transmitted to at least one of a warning light, a defroster, an air conditioner, and a wiper to remove the fog.

A typical fog removing system has a disadvantage in that various kinds of sensors are necessarily provided to detect fog, an accuracy is varied depending on a degree of precision or a degree of deterioration of an element, and a state in which the fog is seen on eyes of an actual driver is not reflected to a fog removing method.

SUMMARY

The present disclosure provides a fog preventing device.

However, the effects of the embodiments of the inventive concept are not limited to the above description.

An embodiment of the inventive concept provides a fog removing device including: a sensor configured to detect fog to generate sensing data; a heater configured to generate heat to remove the fog; and a control unit configured to supply a power to the heater by using the sensing data. The sensor includes: a substrate; a first electrode and a second electrode, which are provided on the substrate and electrically disconnected from each other; and a recess region defined between the first and second electrodes.

In exemplary embodiment, the recess region may have a width of about 1 µm to about 100 µm.

In exemplary embodiment, the sensor may be disposed between a vehicle windshield and a room mirror.

In exemplary embodiment, the sensor may be provided in plurality, and the plurality of sensors may be disposed adjacent to an edge of the vehicle windshield.

In exemplary embodiment, the recess region may extend in a straight line shape or a zigzag shape.

In exemplary embodiment, the sensor may further include an island pattern provided between the first and second electrodes, and the island pattern may be electrically disconnected from the first electrode and the second electrode.

In exemplary embodiment, the recess region may surround the island pattern.

In exemplary embodiment, the sensor may further include a first auxiliary pattern and a second auxiliary pattern, which are provided between the first and second electrodes, and the first and second electrodes and the first and second auxiliary patterns may be electrically disconnected from each other.

In exemplary embodiment, the fog removing device may further include a first auxiliary pattern and a second auxiliary pattern, which are provided between the first and second electrodes, and the first and second electrodes and the first and second auxiliary patterns may be electrically disconnected from each other.

In exemplary embodiment, the fog removing device may further include a memory unit, and the control unit may compare the sensing data with reference value data stored in the memory unit to determine the power supplied to the heater.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
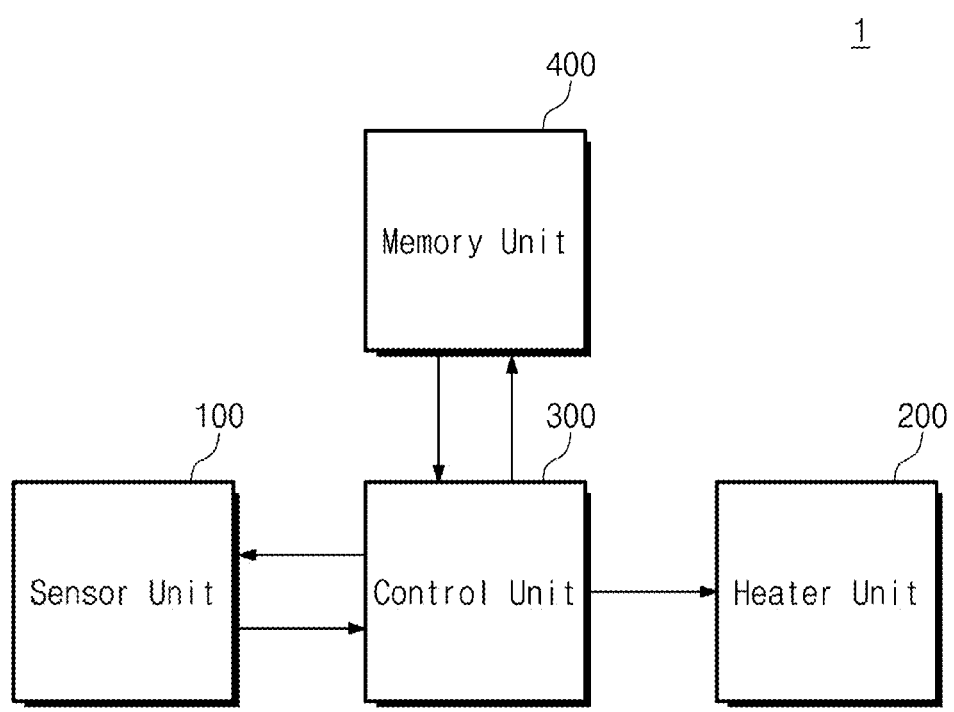
FIG. 1 is a block diagram for explaining a fog removing device according to exemplary embodiments of the inventive concept.

Exemplary embodiments of technical ideas of the inventive concept will be described with reference to the accompanying drawings so as to sufficiently understand constitutions and effects of the inventive concept. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. The embodiment in the detailed description will be described with cross-sectional views and/or plan views as ideal exemplary views of the inventive concept. In the figures, the dimensions of regions are exaggerated for effective description of the technical contents. Areas exemplified in the drawings have general properties, and are used to illustrate a specific shape of a semiconductor package region. Thus, this should not be construed as limited to the scope of the present invention. It will be understood that although the terms first and second are used herein to describe various elements, these elements should not be limited by these terms. These terms are only used to distinguish one component from another component. Embodiments described and exemplified herein include complementary embodiments thereof.

In the following description, the technical terms are used only for explaining a specific exemplary embodiment while not limiting the inventive concept. In this specification, the terms of a singular form may include plural forms unless specifically mentioned. The meaning of 'comprises' and/or 'comprising' does not exclude other components besides a mentioned component.

Hereinafter, the present invention will be described in detail by explaining preferred embodiments of the invention with reference to the attached drawings.

FIG. 1 is a block diagram for explaining a fog removing device according to embodiments of the inventive concept.

Referring to FIG. 1, a fog removing device 1 including a sensor unit 100, a heater unit 200, a control unit 300, and a memory unit 400 may be provided. The sensing unit 100 may generate sensing data regarding an amount of water drops (i.e., a degree of fog generation) in a portion in which fog is generated (e.g., an inside surface of a vehicle windshield). The control unit 300 may compare the sensing data with reference value data stored in the memory unit 400 to generate comparative data. The control unit 300 may provide the comparative data to the heater unit 200. The heater unit 200 may include a heater (not shown) and a heater control part (not shown). The heater control part may determine a power to be supplied to the heater on the basis of the comparative data. The heater control part may supply the power to the heater. The heater may generate heat by using the power. The water drops may be removed (i.e., fog is removed) by the heat.

Figure 2:
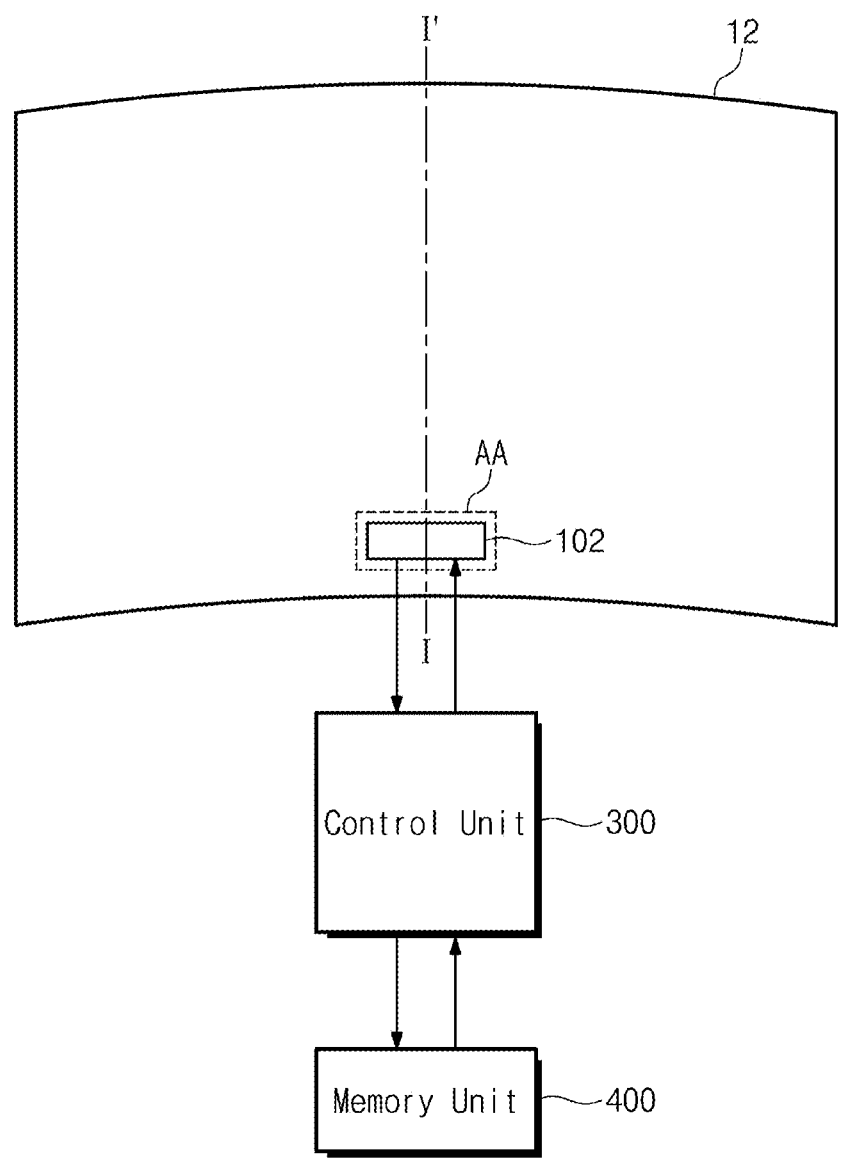
FIG. 2 is a front view illustrating a fog removing device according to exemplary embodiments of the inventive concept.
Figure 3:
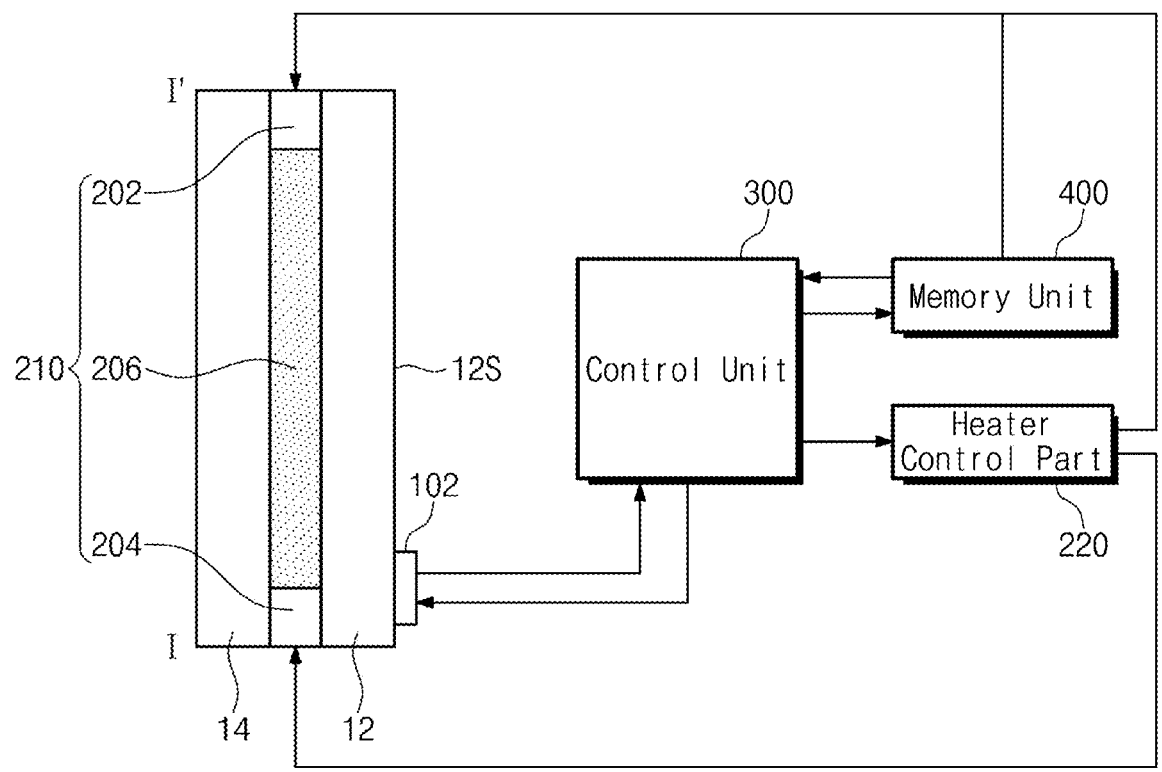
FIG. 3 is a cross-sectional view taken along line I-I' of FIG. 2.
Figure 4:
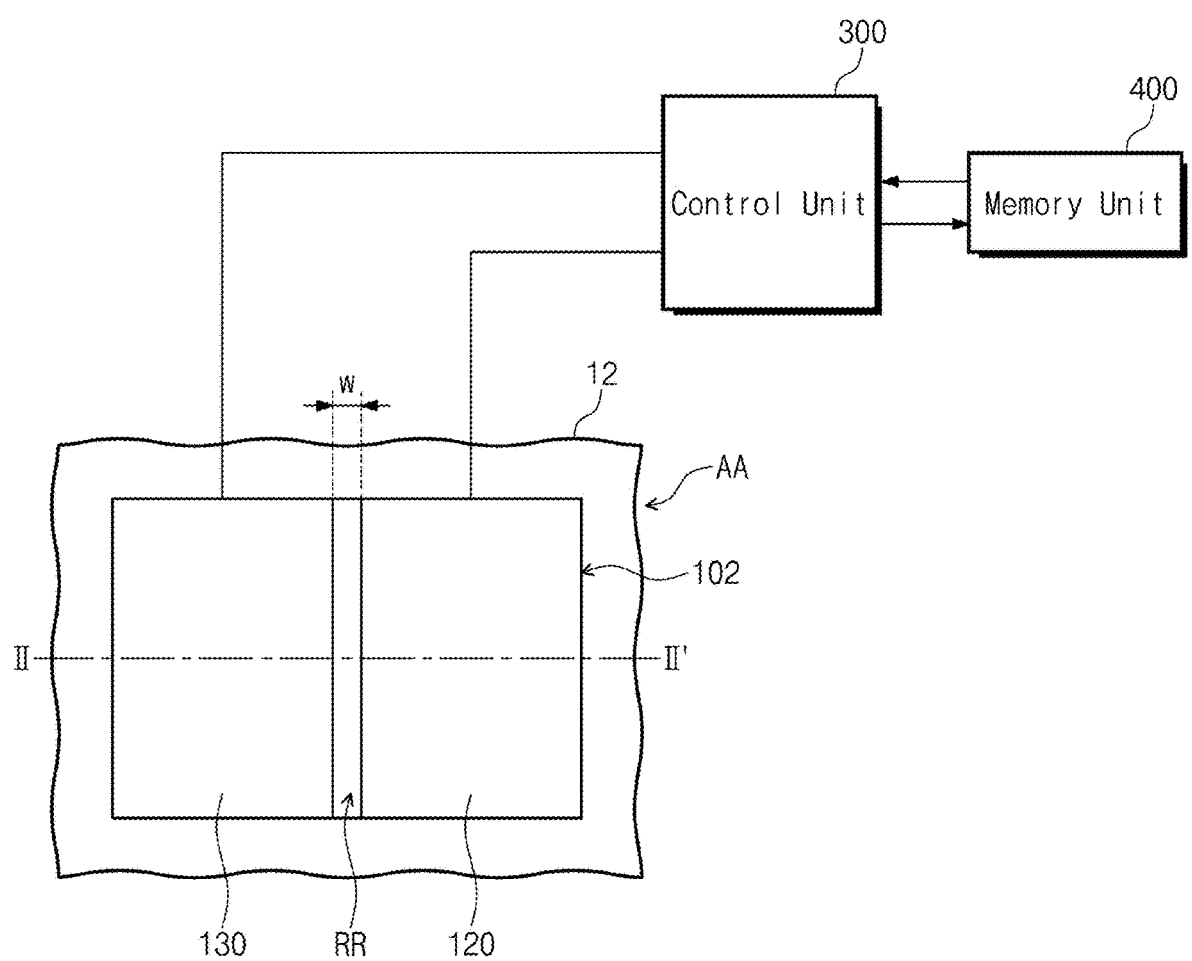
FIG. 4 is an enlarged view illustrating a region AA of FIG. 2.
Figure 5:
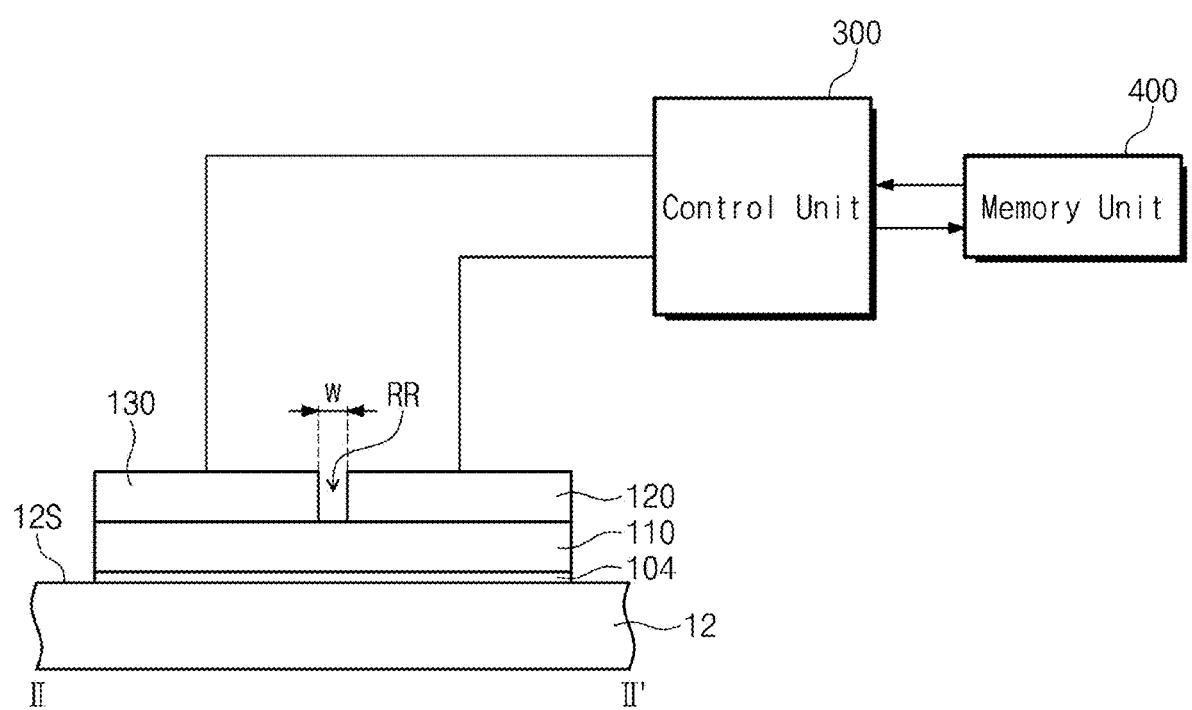
FIG. 5 is a cross-sectional view taken along line II-II' of FIG. 4.

FIG. 2 is a front view illustrating the fog removing device according to exemplary embodiments of the inventive concept. FIG. 3 is a cross-sectional view taken along line I-I' of FIG. 2. FIG. 4 is an enlarged view illustrating a region AA of FIG. 2. FIG. 5 is a cross-sectional view taken along line II-II' of FIG. 4.

Referring to FIGS. 2 and 3, a first glass 12, a second glass 14, a sensor 102, a heater 210, a heater control part 220, a control unit 300, and a memory unit 400 may be provided. The first and second glasses 12 and 14 may be parallel to each other. In exemplary embodiments, the first and second glasses 12 and 14 may be portions of a vehicle windshield. For example, the first glass 12 may be disposed inside the vehicle, and the second glass 14 may be disposed outside a vehicle. As water drops (not shown) are formed on a surface 12S of the first glass 12 due to a temperature difference between the inside and outside of the vehicle, fog may be generated on the surface 12S of the first glass 12.

The sensor 102 may be provided on the surface 12S of the first glass 12. The sensor 102 may be disposed adjacent to an edge of the first glass 12 so as not to prevent a driver's view. For example, the sensor 102 may be disposed on a central lower portion of the surface 12S of the first glass 12. The sensor 102 may have a horizontal size of about 2 mm to about 1000 mm and a vertical size of about 2 mm to about 1000 mm. Hereinafter, the sensor 102 will be described in detail.

Referring to FIGS. 4 and 5, the sensor 102 including a substrate 110, a first electrode 120, and a second electrode 130 may be provided. The substrate 110 may be provided on the first glass 12. For example, the substrate 110 may include a transparent organic film (e.g., poly(ethylene terephthalate) (PET), polycarbonate (PC), and polyimide (PI)) or transparent glass.

As an adhesive layer 104 is provided between the substrate 110 and the first glass 12, the substrate 110 may be fixed on the surface 12S of the first glass 12. For example, the adhesive layer 104 may include an optically clear adhesive (OCA) or an optically clear resin (OCR).

The first and second electrodes 120 and 130 may be disposed on the substrate 110. The first and second electrodes 120 and 130 may be spaced apart from each other in a direction parallel to a top surface of the substrate 110. The first and second electrodes 120 and 130 may be electrically disconnected from each other. Each of the first and second electrodes 120 and 130 may have a surface resistance of about 0.1Ω/□ to about 1000Ω/□. The first and second electrodes 120 and 130 may have hydrophilic properties. The first and second electrodes 120 and 130 may include a transparent electrode (e.g., indium tin oxide (ITO)), a metal nanowire, a metal mesh, a metal halide, oxide/metal/oxide hybrid electrodes, a conductive polymer, or an opaque metal electrode.

A recess region RR may be provided between the first and second electrodes 120 and 130. The recess region RR may separate the first and second electrodes 120 and 130 from each other. The recess region RR may extend in a straight line shape. Although the recess region RR is illustrated to extend in a direction perpendicular to the edge of the sensor 102, the embodiment of the inventive concept is not limited thereto. In other exemplary embodiments, the recess region RR may extend in a direction inclined to the edge of the sensor 102 (i.e., diagonal direction). The recess region RR may have an extension length of about 10 mm to about 2000 mm. The recess region RR may have a width W that is determined so that the first and second electrodes 120 and 130 are electrically connected from each other when fog is generated to obstruct the driver's view. For example, the recess region RR may have a width W of about 1 μm to about 100 μm. The width W of the recess region RR may be a spaced distance between the first and second electrodes 120 and 130.

Each of the first and second electrodes 120 and 130 may be electrically connected to the control unit 300. The first and second electrodes 120 and 130 may be applied with voltages each having a different magnitude from the control unit 300. Since the first and second electrodes 120 and 130 are separated from each other, a current may not flow between the first and second electrodes 120 and 130.

Referring to FIGS. 2 and 3 again, the heater 210 may be disposed between the first and second glasses 12 and 14. An adhesive film (not shown) may be provided between the heater 210 and the first glass 12 and between the heater 210 and the second glass 14. For example, the adhesive film may include a poly vinyl butyral (PVB) film.

The heater 210 may generate heat by using the power supplied from the heater control part 220. For example, the heater 210 may include an upper electrode 202, a lower electrode 204, and a transparent heater 206. When a voltage is applied to the upper electrode 202 and the lower electrode 204, the transparent heater 206 may generate heat. The transparent heater 206 may have a transparency equal to or greater than about 70%. The transparent heater 206 may have one of a metal and ceramic hybrid type, a metal mesh type, a metal thin-film type, and a metal wire type. When the heater 210 is applied to a vehicle, the heater 210 may have a horizontal size of about 500 mm to about 2000 mm and a vertical size of about 300 mm to about 1500 mm. When the heater 210 is applied to an airplane or a vessel, the heater 210 may have a horizontal size and a vertical size, which are greater than the above numerical range.

The control unit 300 may control the sensor 102, the heater control part 220, and the memory unit 400. The control unit 300 may apply voltages having different magnitudes from each other to the first and second electrodes 120 and 130, respectively.

In exemplary embodiments, fog may be formed on the surface 12S of the first glass 12. Here, water drops may be formed between the first and second electrodes 120 and 130 according to embodiments of the inventive concept. The first and second electrodes 120 and 130 may be electrically connected from each other by the water drops. Accordingly, the heater may operate to remove the fog. Resultantly, the fog removing device capable of automatically removing fog may be provided.

According to an embodiment of the inventive concept, the recess region RR may have the width W that is determined so that the first and second electrodes 120 and 130 are electrically connected from each other when the fog is generated to obstruct the driver's view. Accordingly, the fog removing device may not operate when the generated fog does not obstruct the driver's view. Accordingly, the fog removing device is prevented from excessively operating.

<Fog Removing Method>

Figure 6:
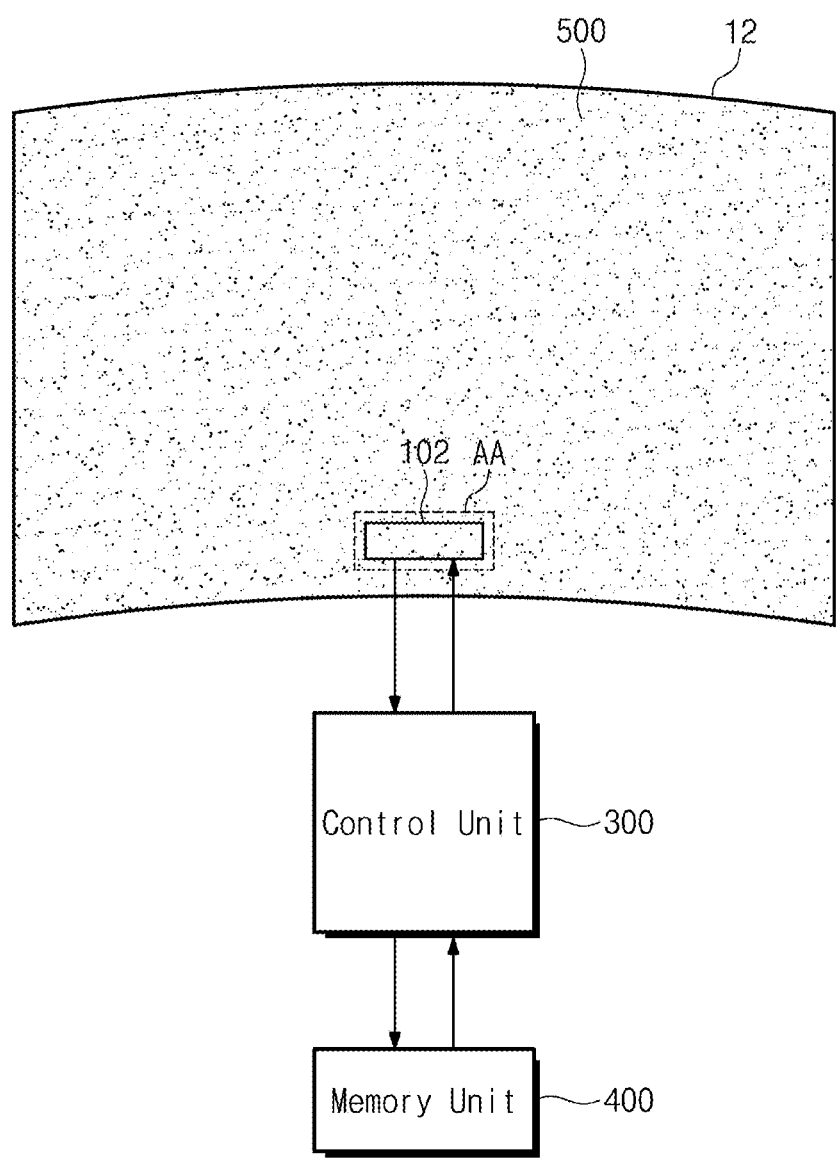
FIG. 6 is a front view illustrating a fog removing device according to exemplary embodiments of the inventive concept.
Figure 7:
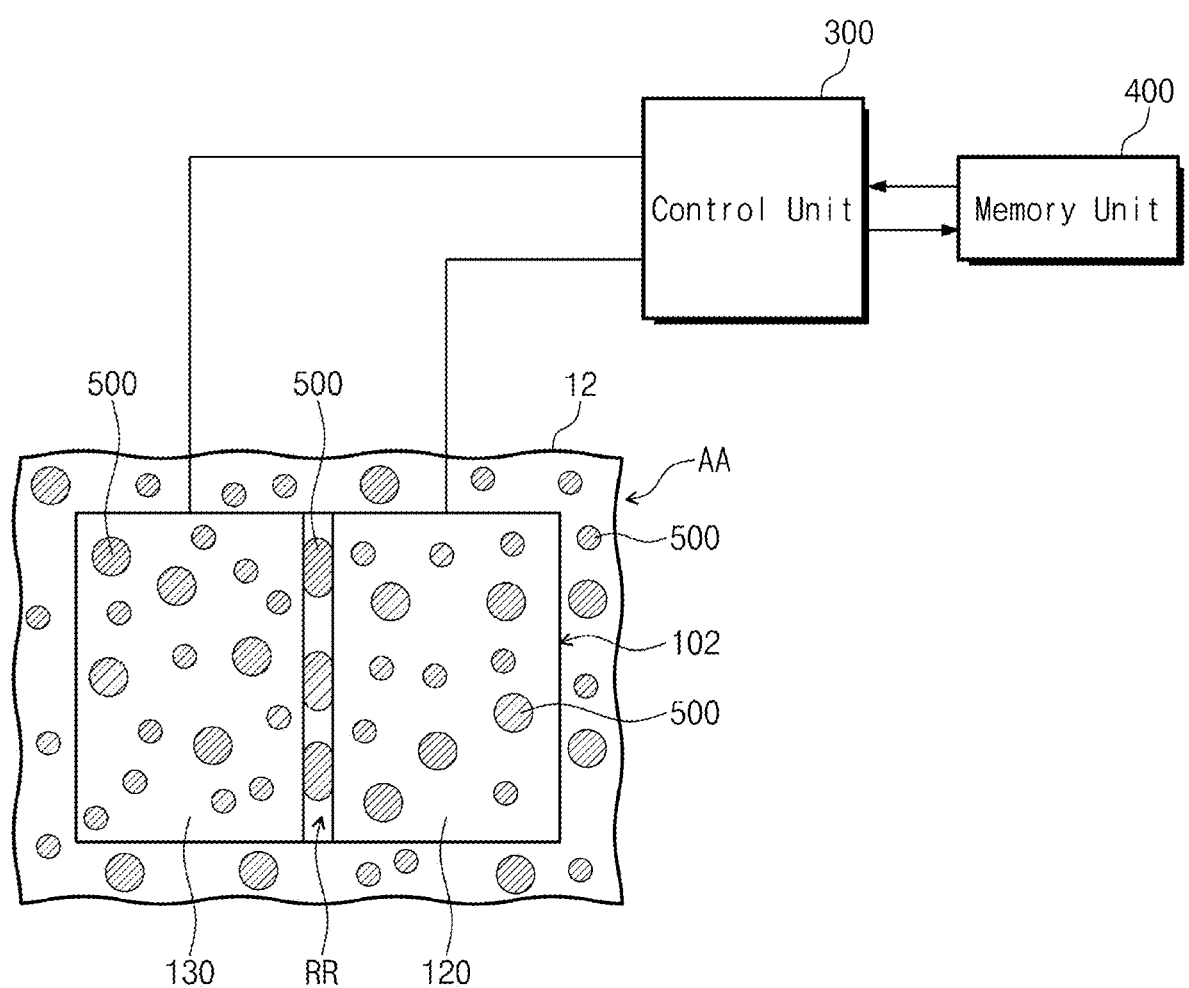
FIG. 7 is an enlarged view of a region AA of FIG. 6.

FIG. 6 is a front view illustrating a fog removing device according to exemplary embodiments of the inventive concept. FIG. 7 is an enlarged view of a region AA of FIG. 6. Table 1 shows conductivity of water. For concise description, the substantially same contents as those described with reference to FIGS. 1 to 5 will not be described.

Referring to FIGS. 6 and 7, a first glass 12 and a sensor 102, on which fog is generated, may be provided. That is, water drops 500 may be formed on a surface 12S of the first glass 12 and a surface of the sensor 102. In exemplary embodiments, the surface 12S of the first glass 12 may be an inside surface of the vehicle windshield, and water drops 500 may be formed on the inside surface of the vehicle windshield due to temperature and moisture differences between the inside and outside of the vehicle. As an amount of the water drops 500 formed on the surface 12S of the first glass 12 increases, visibility of the first glass 12 may decrease. In exemplary embodiments, each of the water drops 500 may have a diameter of about 1 µm to about 100 µm when the visibility of the first glass 12 is degraded to obstruct the driver's view.

A portion of the water drops 500 may be formed in a recess region RR.

TABLE 1

|  | Conductivity |
| --- | --- |
| Pure Water | 0.05 µs/cm |
| Power Plant Boiler Water | 0.05~1 µs/cm |
| Distilled Water | 0.5 µs/cm |
| De-ionized Water | 0.1~10 µs/cm |
| De-mineralized Water | 1~80 µs/cm |
| Mountain Water | 10 µs/cm |
| Drinking Water | 0.5~1 ms/cm |
| Brackish Water | 0.9~9 ms/cm |
| Waste-Water | 1.5 ms/cm |
| Portable Water Maximum | 1~80 ms/cm |
| Industrial Process Water | 7~140 ms/cm |
| Ocean Water | 53 ms/cm |

Referring to table 1, water may have conductivity regardless of kinds thereof. Accordingly, when the water drops are formed in the recess region RR, first and second electrodes 120 and 130 may be electrically connected from each other by the water drops 500.

A control unit 300 may apply voltages having different magnitudes from each other to the first and second electrodes 120 and 130. For example, a difference between voltages applied to the first and second electrodes 120 and 130 may be about 0.001 V to about 45 V. Accordingly, a current may flow between the first and second electrodes 120 and 130. The current may have a magnitude of about 0.0001 µA to about 10 A. The control unit 300 may measure an intensity of the current. An intensity value of the current measured by the control unit 300 may be defined as sensing data. As the amount of water drops formed in the recess region RR increases, the intensity value of the current may increase. The control unit 300 may compare the sensing data with reference value data stored in a memory unit 400 to generate comparative data. The control unit 300 may provide the comparative data to the heater control part 220 (refer to FIG. 3) described with reference to FIG. 3.

The heater control part 220 (refer to FIG. 3) may determine a power to be provided to the heater 210 (refer to FIG. 3) on the basis of the comparative data. For example, the power may be determined within a range that is obtained by using a voltage of about 12 V to about 45 V and a current of about 30 A to about 120 A. The heater 210 (refer to FIG. 3) may generate heat by using the power. The water drops 500 may be removed by the heat. Accordingly, the visibility of the first glass 12 may be enhanced.

Figure 8:
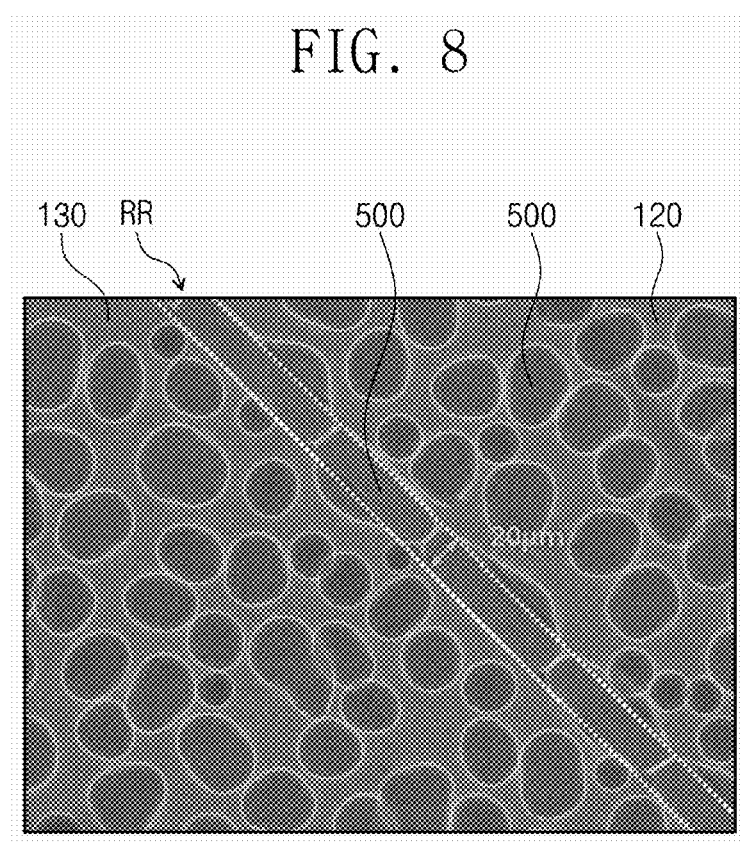
FIG. 8 is a photograph showing a state in which water drops are formed on a sensor.

FIG. 8 is a photograph showing a state in which water drops are formed on a sensor.

Referring to FIG. 8, provided are a first electrode 120, a second electrode 130, a recess region RR, and water drops 500. The first electrode 120 and the second electrode 130 are spaced apart from each other. The recess region RR is provided between the first electrode 120 and the second electrode 130. The recess region RR has a width of about 20 µm. The water drops 500 are formed on the first and second electrodes 120 and 130 and in the recess region RR.

Figure 9:
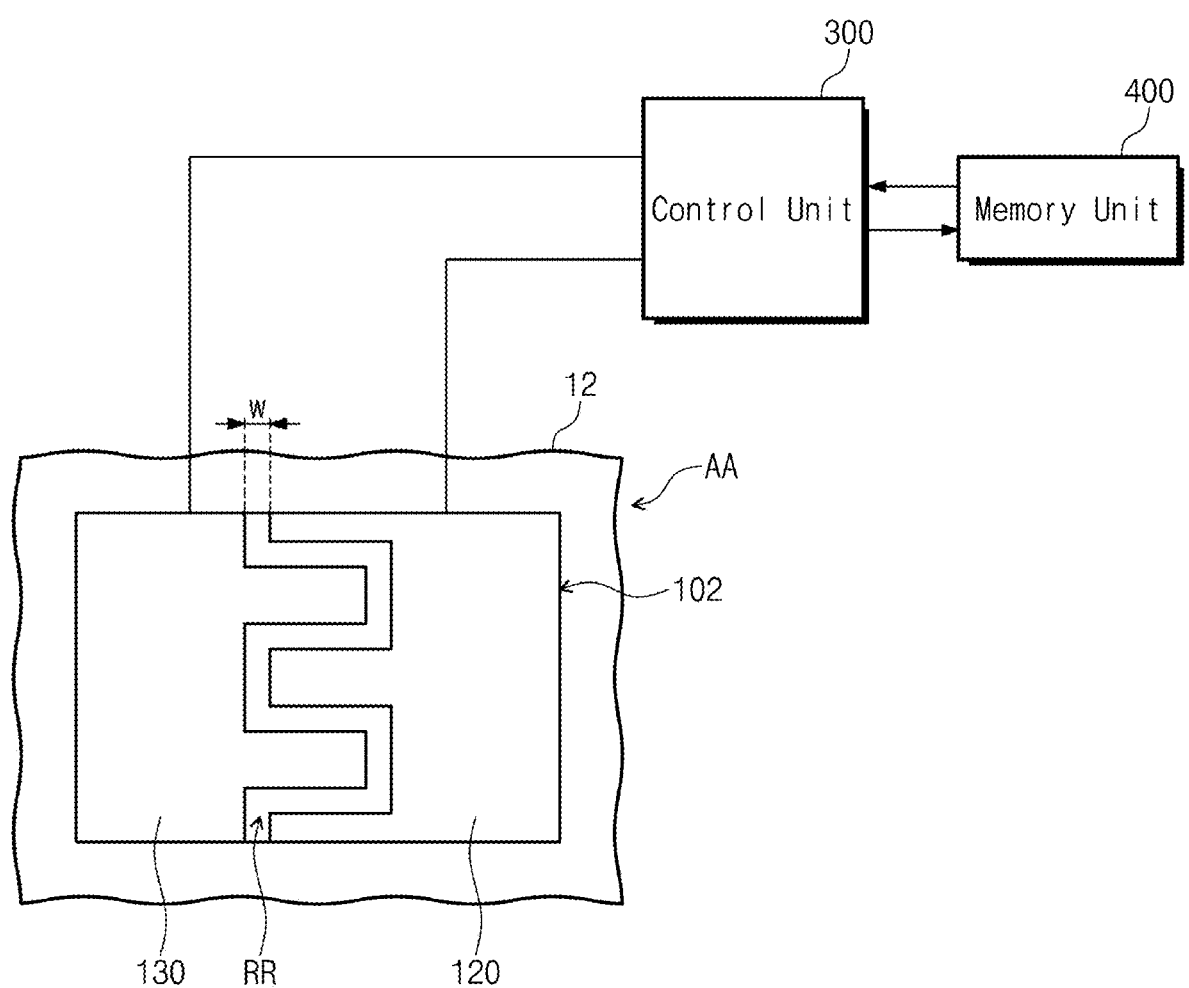
FIG. 9 is an enlarged view illustrating the region AA of FIG. 2 for explaining a sensor unit according to exemplary embodiments of the inventive concept.

FIG. 9 is an enlarged view illustrating the region AA of FIG. 2 for explaining a sensor unit according to exemplary embodiments of the inventive concept. For concise description, the substantially same contents as those described with reference to FIGS. 1 to 5 will not be described.

Referring to FIG. 9, a first glass 12, a first electrode 120, a second electrode 130, a recess region RR, and a control unit 300 may be provided. The first glass 12, the first electrode 120, the second electrode 130, and the control unit 300 may be substantially the same as the first glass 12, the first electrode 120, the second electrode 130, and the control unit 300, which are described with reference to FIG. 4, respectively.

The recess region RR may be provided between the first and second electrodes 120 and 130. The recess region RR may electrically disconnect the first and second electrodes 120 and 130 from each other. Unlike the illustration in FIG. 4, the recess region RR may extend in a shape in which a straight line is drawn in a zigzag manner. Here, the embodiment of the inventive concept is not limited to the shape or the length of the zigzag shape. The recess region RR may have a width W of about 1 µm to about 100 µm. Although the recess region RR is illustrated to be angulated on a portion at which an extension direction is changed, the embodiment of the inventive concept is not limited thereto. In other exemplary embodiments, a portion at which the extension direction is changed may be rounded.

According to an embodiment of the inventive concept, the fog removing device for automatically removing the fog on the surface of the first glass 12 may be provided.

Figure 10:
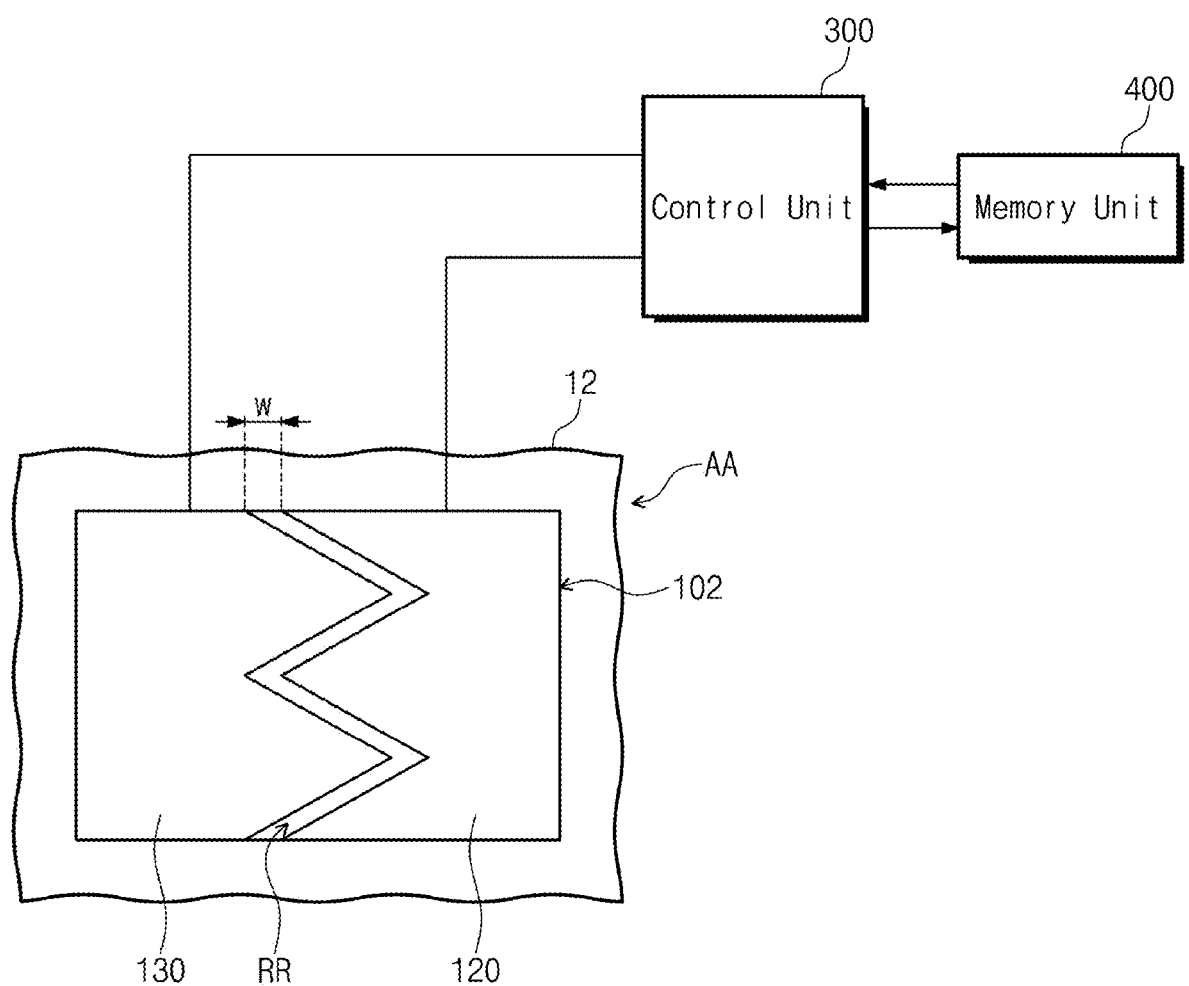
FIG. 10 is an enlarged view illustrating the region AA of FIG. 2 for explaining a sensor unit according to exemplary embodiments of the inventive concept.

FIG. 10 is an enlarged view illustrating the region AA of FIG. 2 for explaining a sensor unit according to exemplary embodiments of the inventive concept. For concise description, the substantially same contents as those described with reference to FIGS. 1 to 5 will not be described.

Referring to FIG. 10, a first glass 12, a first electrode 120, a second electrode 130, a recess region RR, and a control unit 300 may be provided. The first glass 12, the first electrode 120, the second electrode 130, and the control unit 300 may be substantially the same as the first glass 12, the first electrode 120, the second electrode 130, and the control unit 300, which are described with reference to FIG. 4, respectively.

The recess region RR may be disposed between the first and second electrodes 120 and 130. The recess region RR may electrically disconnect the first and second electrodes 120 and 130 from each other. Unlike the illustration in FIG. 4, the recess region RR may extend in a shape in which a diagonal line is repeated in a zigzag manner. Here, the embodiment of the inventive concept is not limited to the repeated number of the shape repeated in a zigzag manner. The recess region RR may have a width W of about 1 µm to about 100 µm.

According to an embodiment of the inventive concept, the fog removing device for automatically removing the fog on the surface of the first glass 12 may be provided.

Figure 11:
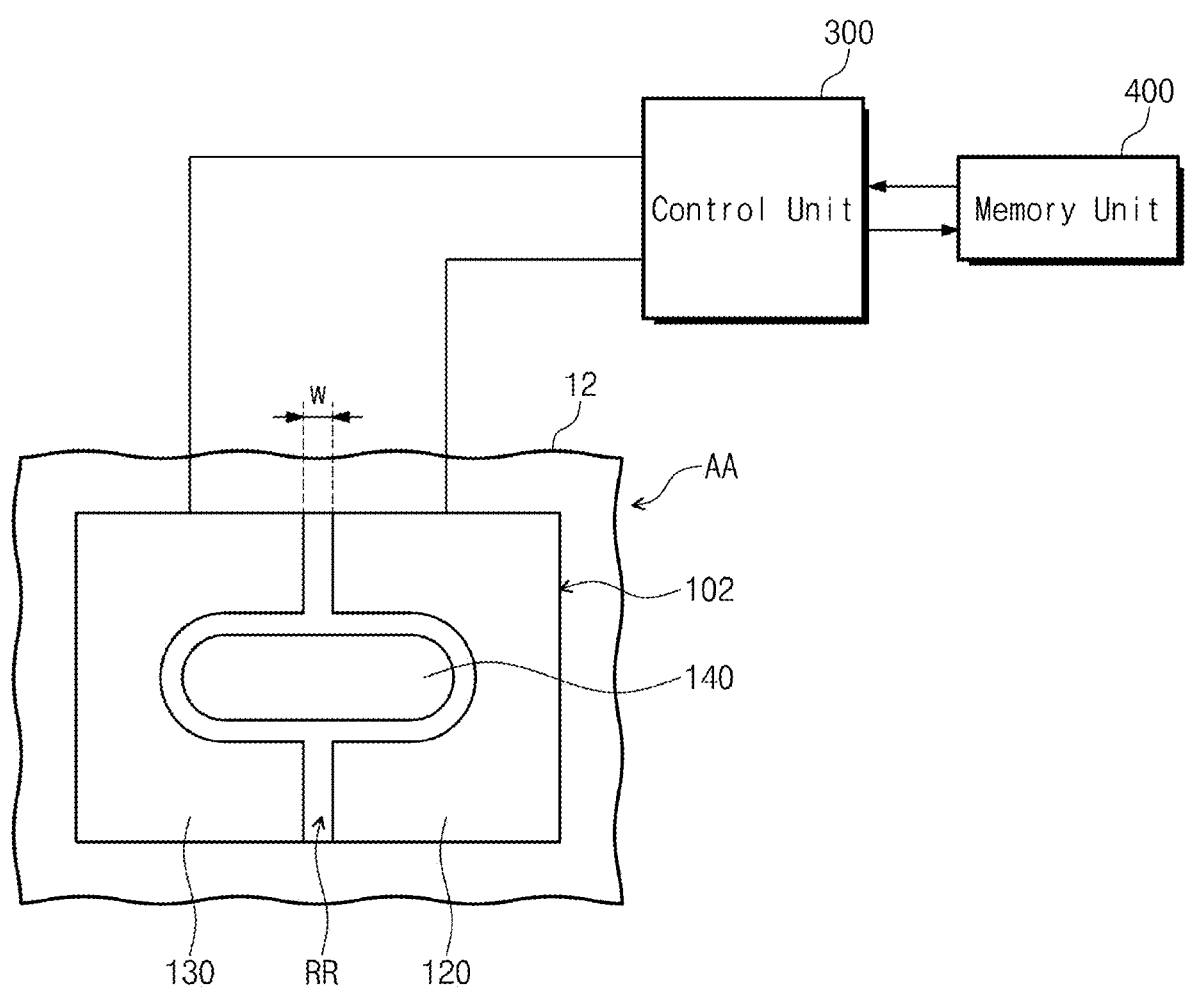
FIG. 11 is an enlarged view illustrating the region AA of FIG. 2 for explaining a sensor unit according to exemplary embodiments of the inventive concept.

FIG. 11 is an enlarged view illustrating the region AA of FIG. 2 for explaining a sensor unit according to exemplary embodiments of the inventive concept. For concise description, the substantially same contents as those described with reference to FIGS. 1 to 5 will not be described.

Referring to FIG. 11, a first glass 12, a first electrode 120, a second electrode 130, a recess region RR, an island pattern 140, and a control unit 300 may be provided. The first glass 12, the first electrode 120, the second electrode 130, and the control unit 300 may be substantially the same as the first glass 12, the first electrode 120, the second electrode 130, and the control unit 300, which are described with reference to FIG. 4, respectively.

The island pattern 140 may be disposed between the first and second electrodes 120 and 130. The island pattern 140 may include the substantially same material as the first and second electrodes 120 and 130. The island pattern 140 may be spaced apart from the first and second electrodes 120 and 130. The island pattern 140 may be electrically disconnected from the first and second electrodes 120 and 130.

The recess region RR may be disposed between the first and second electrodes 120 and 130. The recess region RR may electrically disconnect the first and second electrodes 120 and 130 from each other. Unlike the illustration in FIG. 4, the recess region RR may surround the island pattern 140 while extending between the first and second electrodes 120 and 130. The recess region RR may have a width W of about 1 µm to about 100 µm.

According to an embodiment of the inventive concept, the fog removing device for automatically removing the fog on the surface of the first glass 12 may be provided.

Figure 12:
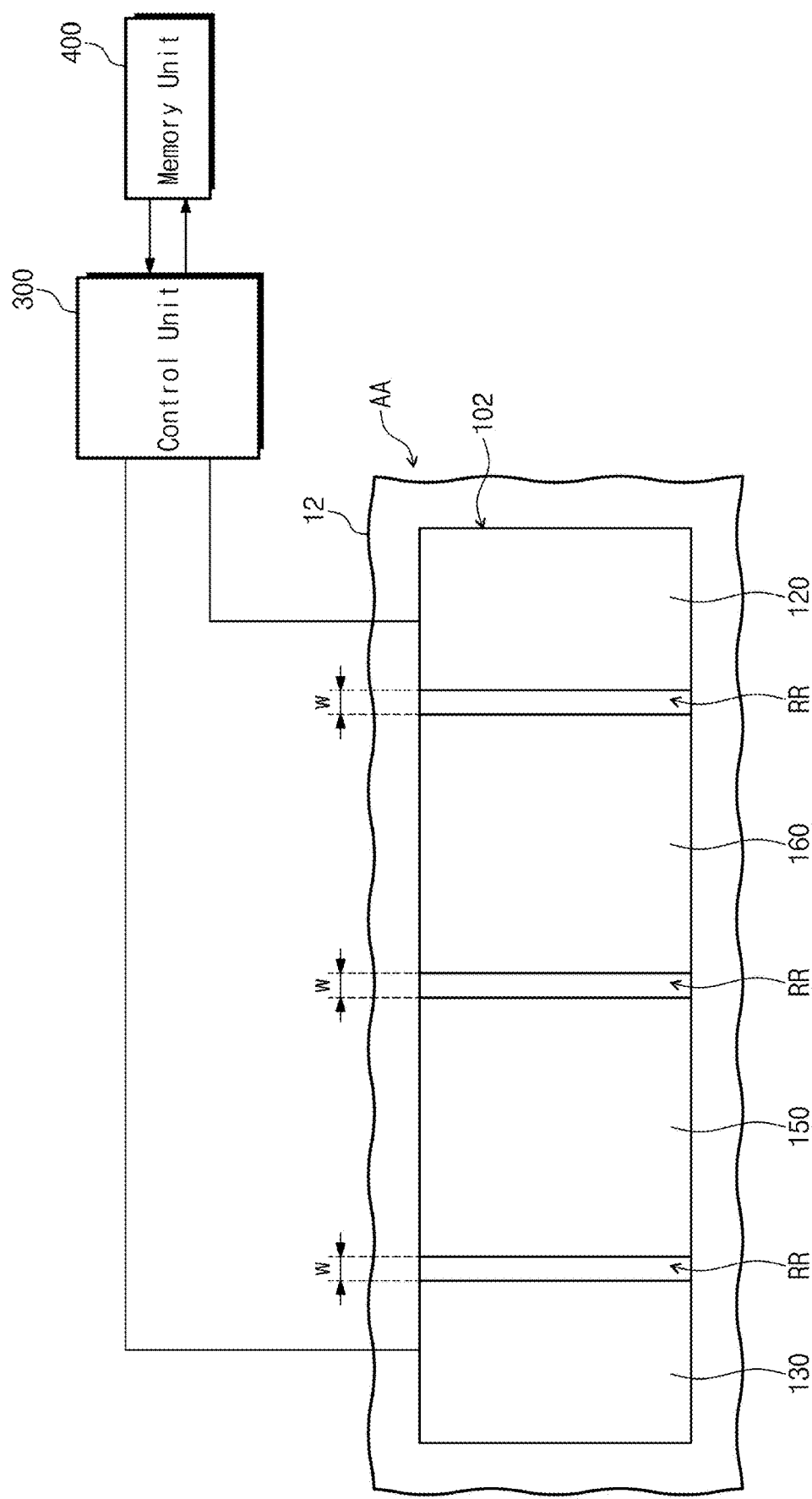
FIG. 12 is an enlarged view illustrating the region AA of FIG. 2 for explaining a sensor unit according to exemplary embodiments of the inventive concept.

FIG. 12 is an enlarged view illustrating the region AA of FIG. 2 for explaining a sensor unit according to exemplary embodiments of the inventive concept. For concise description, the substantially same contents as those described with reference to FIGS. 1 to 5 will not be described.

Referring to FIG. 12, a first glass 12, a first electrode 120, a second electrode 130, a first auxiliary pattern 150, a second auxiliary pattern 160, recess regions RR, and a control unit 300 may be provided. The first glass 12, the first electrode 120, the second electrode 130, and the control unit 300 may be substantially the same as the first glass 12, the first electrode 120, the second electrode 130, and the control unit 300, which are described with reference to FIG. 4, respectively.

The first electrode 120, the second electrode 130, the first auxiliary pattern 150, and the second auxiliary pattern 160 may be spaced apart from each other. The first electrode 120, the second electrode 130, the first auxiliary pattern 150, and the second auxiliary pattern 160 may be electrically disconnected from each other. The recess regions RR may be defined between the first electrode 120 and the second auxiliary pattern 160, between the second auxiliary pattern 160 and the first auxiliary pattern 150, and between the first auxiliary pattern 150 and the second electrode 130, respectively. Each of the recess regions RR has a shape that is exemplarily illustrated. In other exemplary embodiments, the shape of each of the recess regions RR may be substantially the same as the recess region RR in FIG. 4. That is, each of the recess regions RR may extend in a straight line. Each of the recess region RR may have a width W of about 1 µm to about 100 µm. Although three recess regions RR are exemplarily illustrated, the embodiment of the inventive concept is not limited thereto. In other exemplary embodiments, two or four or more recess regions RR may be provided.

According to an embodiment of the inventive concept, as a conductive material (e.g. conductive particles), instead of the water drops, is provided in a portion of the recess regions RR, a portion of each of the first electrode 120, the second electrode 130, the first auxiliary pattern 150, and the second auxiliary pattern 160 may be electrically connected. Here, since another portion of each of the first electrode 120, the second electrode 130, the first auxiliary pattern 150, and the second auxiliary pattern 160 is not electrically connected, a current may not flow through the sensor 102. That is, a malfunction in which the fog removing device operates due to a different factor instead of the water drops may be prevented.

Figure 13:
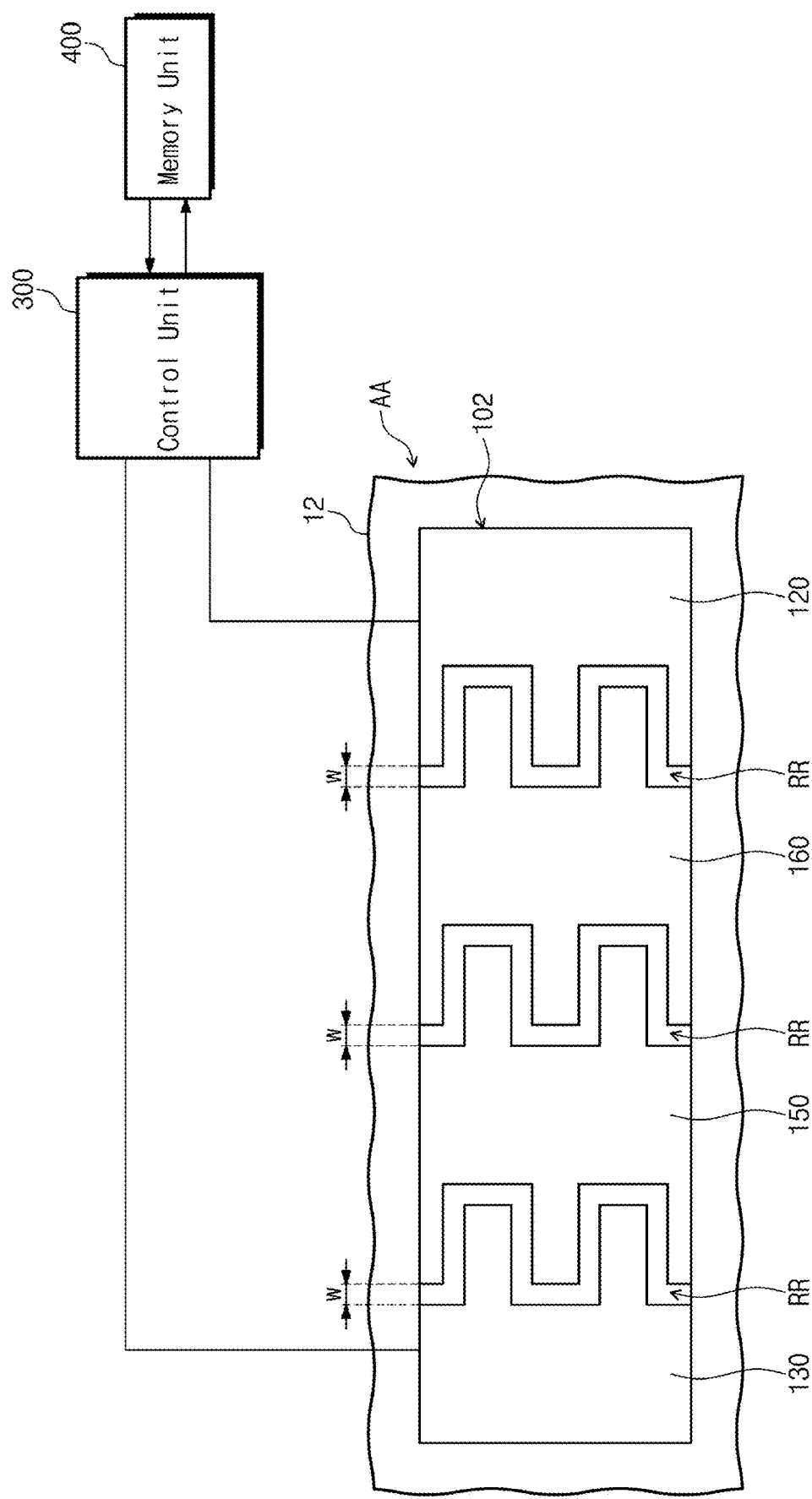
FIG. 13 is an enlarged view illustrating the region AA of FIG. 2 for explaining a sensor unit according to exemplary embodiments of the inventive concept.

FIG. 13 is an enlarged view illustrating the region AA of FIG. 2 for explaining a sensor unit according to exemplary embodiments of the inventive concept. For concise description, the substantially same contents as those described with reference to FIGS. 1 to 5 and 12 will not be described.

Referring to FIG. 13, a first glass 12, a first electrode 120, a second electrode 130, a first auxiliary pattern 150, a second auxiliary pattern 160, recess regions RR, and a control unit 300 may be provided. The first glass 12, the first electrode 120, the second electrode 130, the first auxiliary pattern 150, the second auxiliary pattern 160, and the control unit 300 are substantially the same as the first glass 12, the first electrode 120, the second electrode 130, the first auxiliary pattern 150, the second auxiliary pattern 160, and the control unit 300, which are described with reference to FIG. 12, respectively.

The shape of each of the recess regions RR may be substantially the same as the recess region RR in FIG. 9. That is, each of the recess regions RR may extend in a shape in which a straight line is drawn in a zigzag manner. Each of the recess regions RR may have a width W of about 1 µm to about 100 µm. Although three recess regions RR are exemplarily illustrated, the embodiment of the inventive concept is not limited thereto. In other exemplary embodiments, two or four or more recess regions RR may be provided.

That is, a malfunction in which the fog removing device operates due to a different factor instead of the water drops may be prevented.

Figure 14:
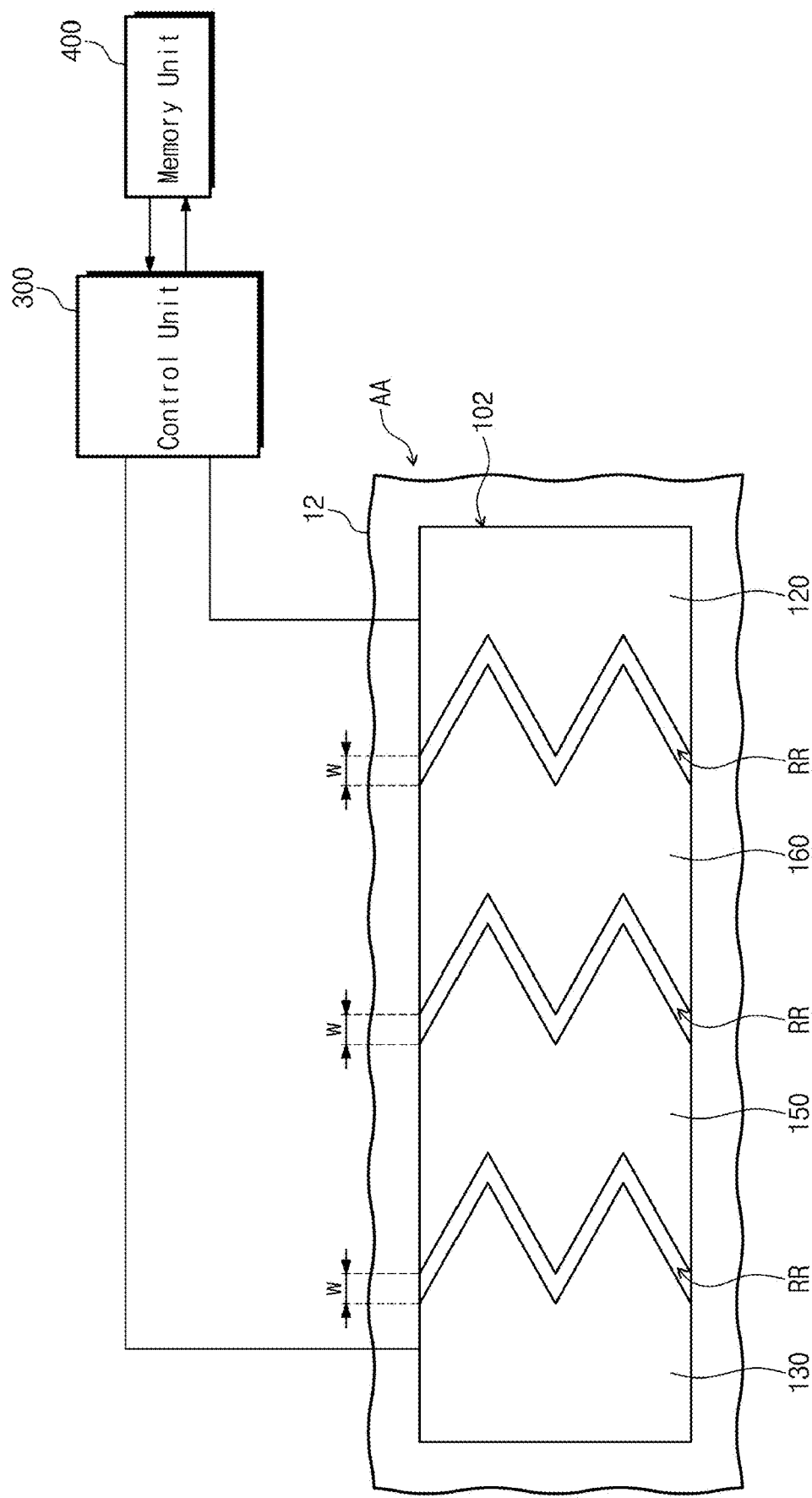
FIG. 14 is an enlarged view illustrating the region AA of FIG. 2 for explaining a sensor unit according to exemplary embodiments of the inventive concept.

FIG. 14 is an enlarged view illustrating the region AA of FIG. 2 for explaining a sensor unit according to exemplary embodiments of the inventive concept. For concise description, the substantially same contents as those described with reference to FIGS. 1 to 5 and 12 will not be described.

Referring to FIG. 14, a first glass 12, a first electrode 120, a second electrode 130, a first auxiliary pattern 150, a second auxiliary pattern 160, recess regions RR, and a control unit 300 may be provided. The first glass 12, the first electrode 120, the second electrode 130, the first auxiliary pattern 150, the second auxiliary pattern 160, and the control unit 300 are substantially the same as the first glass 12, the first electrode 120, the second electrode 130, the first auxiliary pattern 150, the second auxiliary pattern 160, and the control unit 300, which are described with reference to FIG. 12, respectively.

Each of the recess regions RR may have a shape that is substantially the same as the recess region RR in FIG. 10. That is, each of the recess regions RR may extend in a shape in which a diagonal line is repeated in a zigzag manner. Each of the recess regions RR may have a width W of about 1 µm to about 100 µm. Although three recess regions RR are exemplarily illustrated, the embodiment of the inventive concept is not limited thereto. In other exemplary embodiments, two or four or more recess regions RR may be provided.

That is, a malfunction in which the fog removing device operates due to a different factor instead of the water drops may be prevented.

Figure 15:
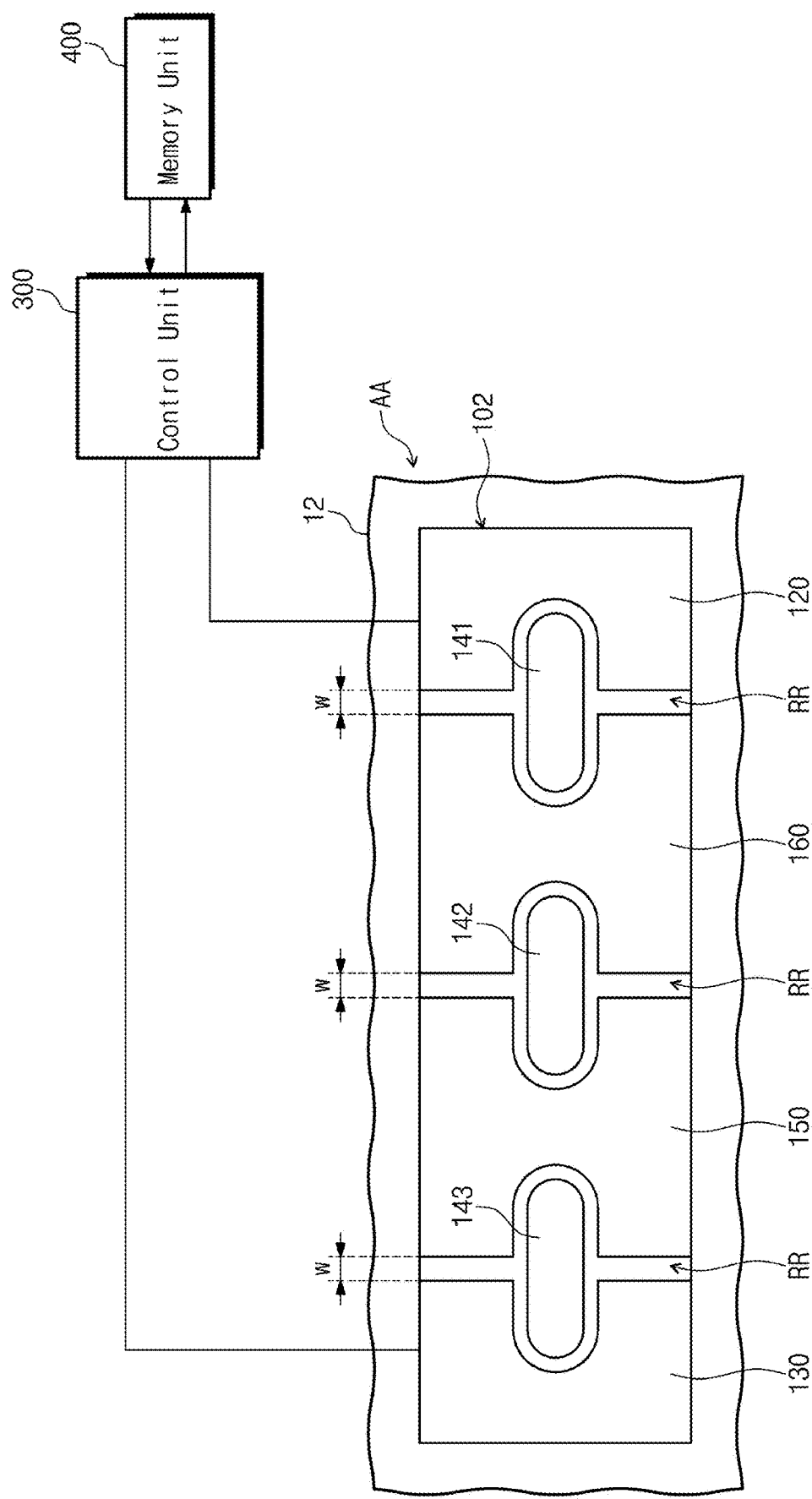
FIG. 15 is an enlarged view illustrating the region AA of FIG. 2 for explaining a sensor unit according to exemplary embodiments of the inventive concept.

FIG. 15 is an enlarged view illustrating the region AA of FIG. 2 for explaining a sensor unit according to exemplary embodiments of the inventive concept. For concise description, the substantially same contents as those described with reference to FIGS. 1 to 5 and 12 will not be described.

Referring to FIG. 15, a first glass 12, a first electrode 120, a second electrode 130, a first island pattern 141, a second island pattern 142, a third island pattern 143, a first auxiliary pattern 150, a second auxiliary pattern 160, recess regions RR, and a control unit 300 may be provided. The first glass 12, the first electrode 120, the second electrode 130, the first auxiliary pattern 150, the second auxiliary pattern 160, and the control unit 300 are substantially the same as the first glass 12, the first electrode 120, the second electrode 130, the first auxiliary pattern 150, the second auxiliary pattern 160, and the control unit 300, which are described with reference to FIG. 12, respectively.

The first island pattern 141 may be disposed between the first electrode 120 and the second auxiliary pattern 160. The first island pattern 141 may include the substantially same material as the first electrode 120 and the second auxiliary pattern 160. The first island pattern 141 may be spaced apart from the first electrode 120 and the second auxiliary pattern 160. The first island pattern 140 may be electrically disconnected from the first electrode 120 and the second auxiliary pattern 160.

The second island pattern 142 may be disposed between the first auxiliary pattern 150 and the second auxiliary pattern 160. The second island pattern 142 may include the substantially same material as the first and second auxiliary patterns 150 and 160. The second island pattern 142 may be spaced apart from the first and second auxiliary patterns 150 and 160. The second island pattern 142 may be electrically disconnected from the first and second auxiliary patterns 150 and 160.

The third island pattern 143 may be disposed between the first auxiliary pattern 150 and the second electrode 130. The third island pattern 143 may include the substantially same material as the first auxiliary pattern 150 and the second electrode 130. The third island pattern 143 may be spaced apart from the first auxiliary pattern 150 and the second electrode 130. The third island pattern 143 may be electrically disconnected from the first auxiliary pattern 150 and the second electrode 130.

The recess region RR may be disposed between the first and second electrodes 120 and 130. The recess region RR may electrically disconnect the first and second electrodes 120 and 130 from each other. Unlike the illustration in FIG. 4, the recess region RR may surround the island pattern 140 while extending between the first and second electrodes 120 and 130. The recess region RR may have a width W of about 1 µm to about 100 µm.

Each of the recess regions RR may have a shape that is substantially the same as the recess region RR in FIG. 14. That is, the recess regions RR may surround the first to third island patterns 141, 142, and 143 while extending between the first and second electrodes 120 and 130 and the first and second auxiliary patterns 150 and 160, respectively. Each of the recess regions RR may have a width W of about 1 µm to about 100 µm. Although three recess regions RR are exemplarily illustrated, the embodiment of the inventive concept is not limited thereto. In other exemplary embodiments, two or four or more recess regions RR may be provided.

That is, a malfunction in which the fog removing device operates due to a different factor instead of the water drops may be prevented.

Figure 16:
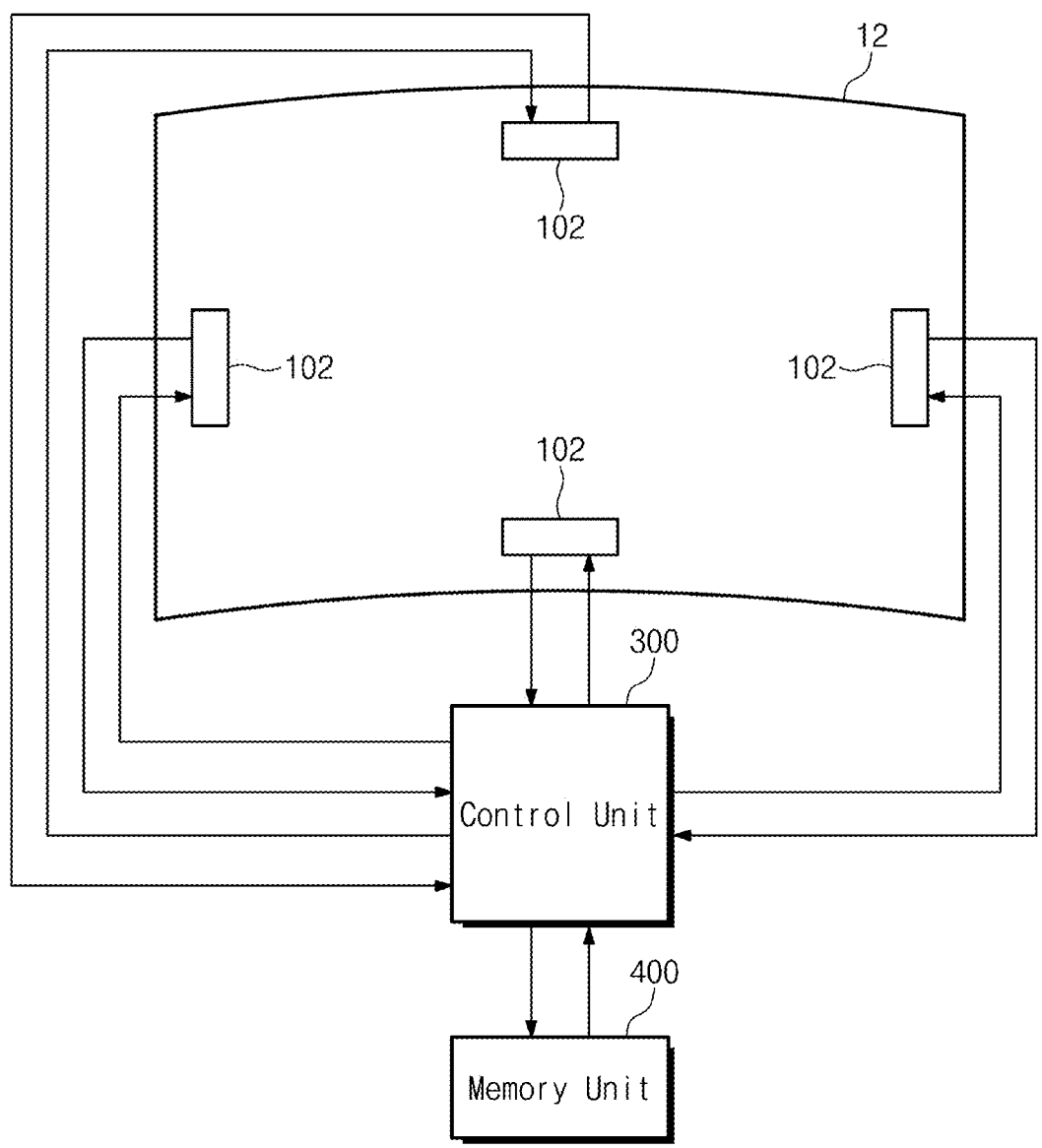
FIG. 16 is a front view illustrating a fog removing device according to exemplary embodiments of the inventive concept.

FIG. 16 is a front view illustrating a fog removing device according to exemplary embodiments of the inventive concept. For concise description, the substantially same contents as those described with reference to FIGS. 2 to 5 will not be described.

Referring to FIG. 16, a first glass 12, sensors 102, a control unit 300, and a memory unit 400 may be provided. The first glass 12, the control unit 300, and the memory unit 400 may be substantially the same as the first glass 12, the control unit 300, and the memory unit 400, which are described with reference to FIGS. 2 to 5.

Each of the sensors 102 may be substantially the same as the sensor 102, which is described with reference to FIGS. 2 to 5, except for the number of the sensors 102. The sensor 102 may be provided on a surface 12S of the first glass 12.

The sensor 102 may be disposed adjacent to an edge of the first glass 12 so as not to prevent the driver's view. For example, the sensor 102 may be disposed on a central upper portion, a central lower portion, a central left side, and a central right side of the surface 12S of the first glass 12. The sensor 102 provided on the central upper portion of the surface 12S of the first glass 12 may be disposed between the first glass 12 and the room mirror (not shown) of the vehicle. Although four sensors 102 are illustrated, the embodiment of the inventive concept is not limited thereto. In other exemplary embodiments, four or more or four or less sensor s102 may be provided on the surface 12S of the first glass 12.

According to the embodiments of the inventive concept, the fog removing device that automatically removes fog may be provided.

However, the effects of the embodiments of the inventive concept are not limited to the above description.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A fog removing device comprising:
    a sensor configured to detect fog to generate sensing data;
    a heater configured to generate heat to remove the fog; and
    a control unit configured to supply a power to the heater by using the sensing data,
    wherein the sensor comprises:
        a substrate;
        a first electrode and a second electrode, which are provided on the substrate and spaced apart from each other;
        a first auxiliary pattern and a second auxiliary pattern, which are provided between the first and second electrodes; and
        a plurality of recess regions defined between the first and second electrodes and configured to decrease electrical resistance between the first and second electrodes and allow a current to flow therethrough between the first and second electrodes when water drops are formed therein, the plurality of recess regions each having a width of 1 μm to 100 μm,
    wherein the first and second electrodes and the first and second auxiliary patterns are electrically disconnected from each other by the plurality of recess regions,
    wherein the first and second electrodes and the first and second auxiliary patterns are arranged along a first direction, and
    wherein the first and second electrodes, the first and second auxiliary patterns, and the plurality of recess regions each extend in a second direction that intersects the first direction.

2. The fog removing device of claim 1, wherein the sensor is disposed between a vehicle windshield and a room mirror.

3. The fog removing device of claim 1, wherein the sensor is provided in plurality, and
    the plurality of sensors are disposed adjacent to an edge of the vehicle windshield.

4. The fog removing device of claim 1, wherein the plurality of recess regions each extend in a straight line shape or a zigzag shape.

5. The fog removing device of claim 1, wherein the sensor further comprises a plurality of island patterns provided between the first and second electrodes, and
    the plurality of island patterns are electrically disconnected from the first electrode and the second electrode.

6. The fog removing device of claim 5, wherein the plurality of recess regions surround the plurality of island patterns.

7. The fog removing device of claim 1, further comprising a memory unit,
    wherein the control unit compares the sensing data with reference value data stored in the memory unit to determine the power supplied to the heater.

8. The fog removing device of claim 7, wherein the sensing data are intensity values of a current flowing between the first and second electrodes by water drops formed in the recess region, and
    the reference value data are data on a relationship between the intensity values of the current and the power.

9. The fog removing device of claim 1, wherein surface resistance of each of the first and second electrodes is in a range from $0.1\Omega/\square$ to $1000\Omega/\square$.

10. The fog removing device of claim 1, wherein the sensor further comprises an adhesive layer provided between the substrate of the sensor and an inside surface of a vehicle windshield.

* * * * *